United States Patent [19]

Deary

[11] Patent Number: 4,688,910

[45] Date of Patent: Aug. 25, 1987

[54] TRANSPARENCY PRESENTATION DEVICE

[75] Inventor: William L. Deary, San Antonio, Tex.

[73] Assignee: The Psychological Corporation, San Antonio, Tex.

[21] Appl. No.: 822,908

[22] Filed: Jan. 27, 1986

[51] Int. Cl.⁴ .............................................. G03B 21/14
[52] U.S. Cl. ...................................... 353/88; 353/97; 353/DIG. 5; 353/120
[58] Field of Search ................. 353/122, 120, DIG. 5, 353/88, 97

[56] References Cited

U.S. PATENT DOCUMENTS 3,269,261 8/1966 Porter ........................... 353/DIG. 5
3,661,449 5/1972 Wright .................................. 353/88

FOREIGN PATENT DOCUMENTS 2055228 2/1981 United Kingdom ................ 353/120

Primary Examiner—Harry N. Haroian
Attorney, Agent, or Firm—Kenyon & Kenyon

[57] ABSTRACT

The invention relates to a device for facilitating the handling of transparencies to be projected by an overhead projector. The device includes a support frame which can be secured by adhesive means to the light table of a projector. A transparency is placed on the support frame, and extends across an aperture in the frame through which light is projected upwardly. An aperture cover which encloses the support frame is mounted thereon for reciprocating movement between a position covering the aperture to a position exposing the aperture. Accordingly, the aperture cover enables the projected light to be interrupted when a transparency is being changed on the support frame.

7 Claims, 8 Drawing Figures

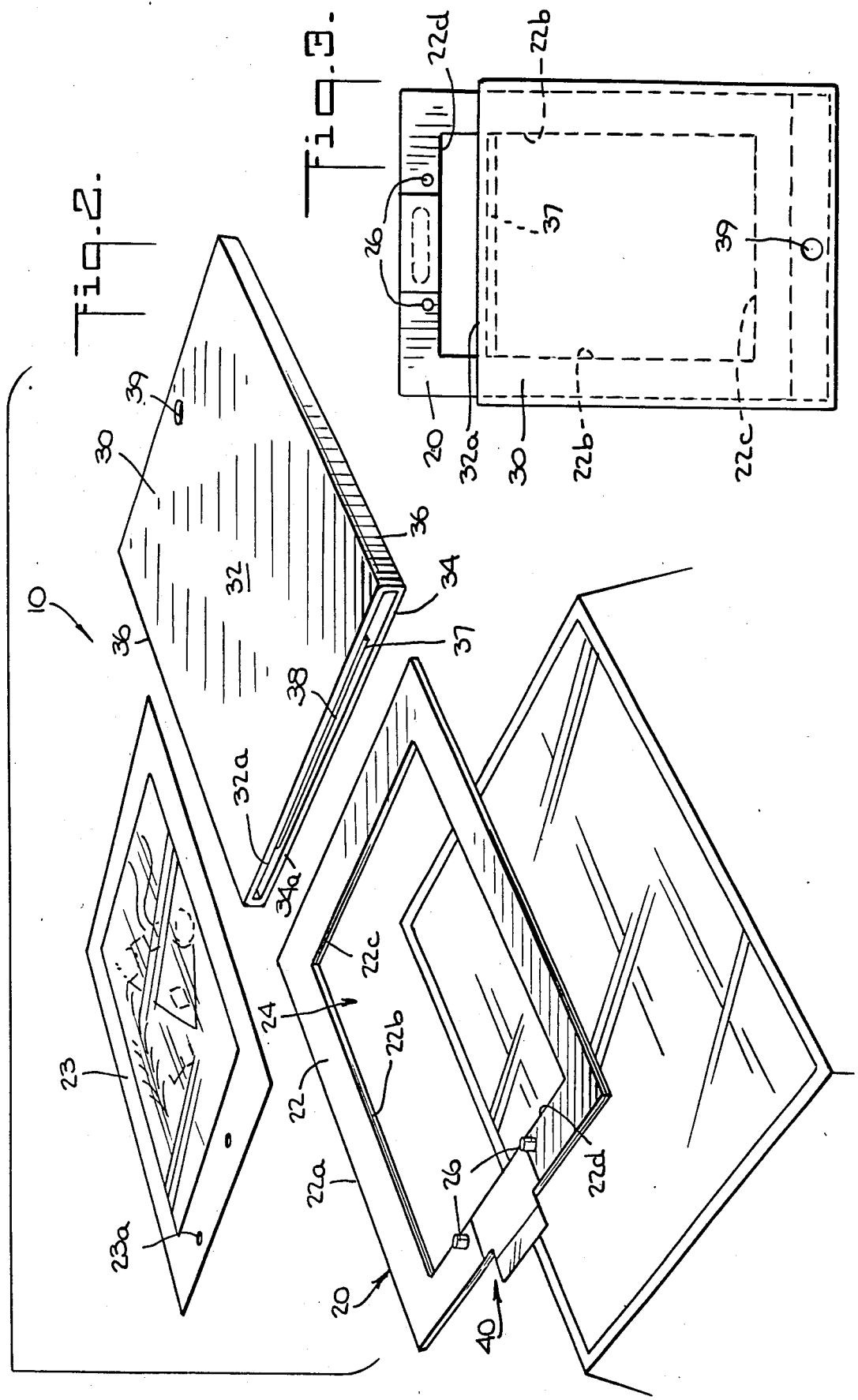

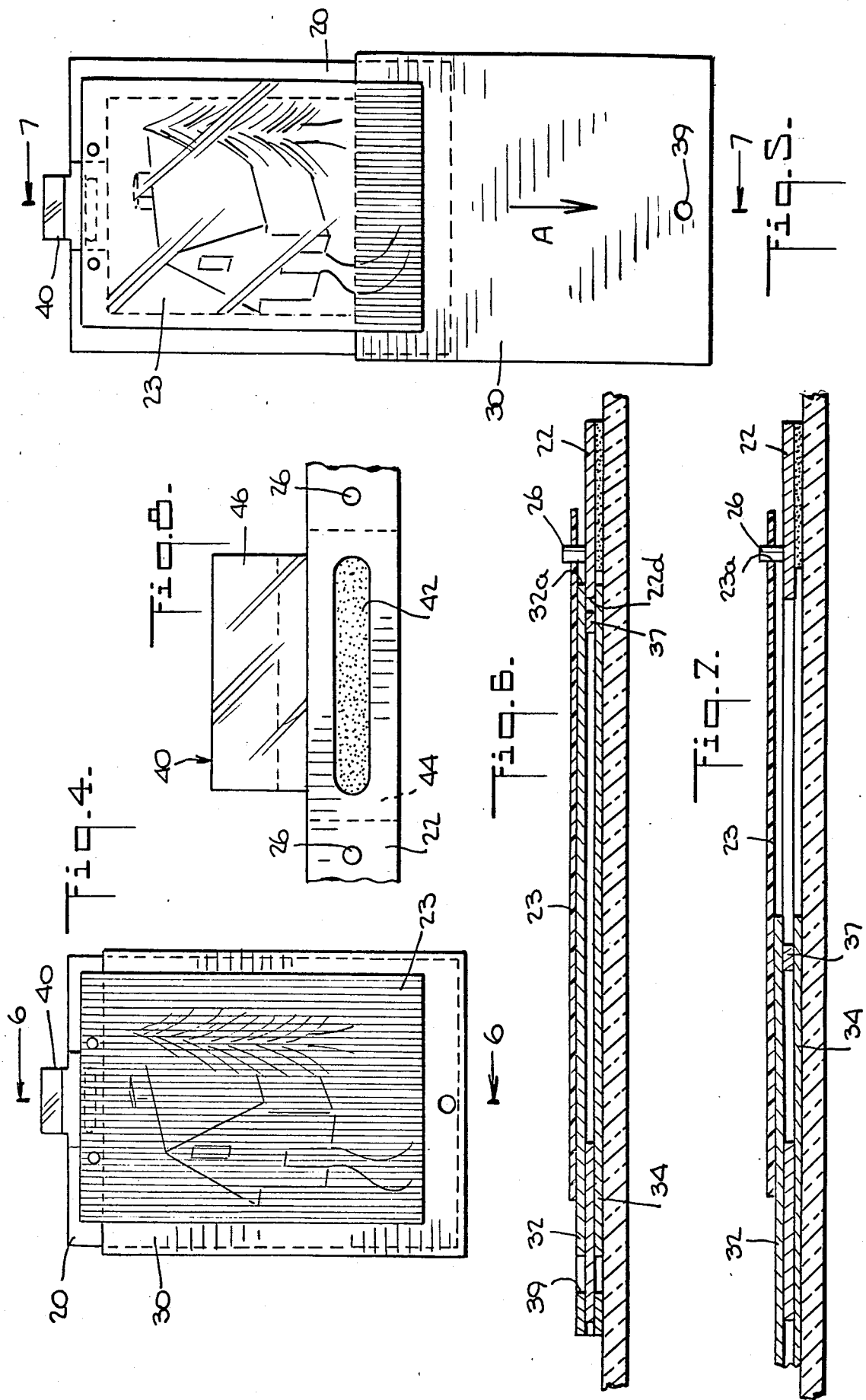

TRANSPARENCY PRESENTATION DEVICE

BACKGROUND OF THE INVENTION

1. Field of the Invention

This invention relates to the field of overhead projectors, and more particularly to the field of accessories for overhead projectors to facilitate the handling of transparencies to be projected.

With the advent of relatively compact, inexpensive overhead projectors, these devices have become very popular for making presentations of printed matter, sketches, charts, and the like, such as those made by salespersons or executives or made by teachers in the classroom. Thus, a plurality of transparencies containing information helpful to the presentation are prepared and then are sequentially positioned on the light table of an overhead projector during the presentation.

2. Description of the Prior Art

A problem which has plagued the sequential projection of transparencies is that of positioning the transparency on the light table of the projector. Another problem is that of continuing projection as a given transparency is being replaced. Thus, leaving the projector light on while changing transparencies has proven highly disruptive to the presentation.

It also has been a problem of facilitating positioning of transparencies and light control where there are a variety of different overhead projectors available which simply have a light table. Thus, a user is confronted with the need for a transparency device which is portable and adapted to be used with the light tables of a variety of different projectors.

Certain light projectors are provided with built-in stages for positioning transparencies and with built-in devices for blocking the projection light while a transparency is being changed; however, such stages and devices ar enot available to be used with other projectors since they are integrated or built-in to a given projector.

As to light control, the common technique is to turn on the projector light only after a transparency is positioned, and then turn off the projector light while changing the transparency. It can readily be imagined that this solution produces considerable wasted motion on the part of the individual making the presentation and generally slows down the presentation. Another technique is to use an expedient device to block the light. For example, one expedient method is to tape one edge of a piece of cardboard over the projector lens. The cardboard can be flipped down while changing transparencies, and flipped up to show slides. As with most field expedients, a technique of this nature detracts from the professionalism of a presentation, and is subject to problems such as the tape cracking or becoming fatigued in the midst of a presentation.

Techniques such as those discussed above are relatively common because solutions proposed by the art have been cumbersome or expensive. For example, U.S. Pat. No. 3,510,214 which issued on May 5, 1970 to Crow, proposes an adaptor accessory for overhead projectors which takes several embodiments, each requiring a permanent installation to the projector. The necessity for a permanent installation due to the complexity of the device, prevents the device from being portable for use with different projectors. Similarly, U.S. Pat. No. 3,661,449 which issued on May 9, 1972 to Wright also requires a permanent installation on a projector. The device of Wright includes several shutters for varying portions of a transparency to be exposed, but at the price of a relatively complicated piece of equipment which is not portable. Thus, such a device would not be suitable for a person to carry in for example, a brief case, and would not enable the person who must make presentations at a variety of locations using a variety of overhead projectors (such as a salesperson).

Each of U.S. Pat. No. 3,531,193 which issued on Sept. 29, 1970 to Diehl, U.S. Pat. No. 3,084,594 which issued on Apr. 9, 1963 to Ray, and U.S. Pat. No. 2,767,611 which issued on Oct. 23, 1956 to Gerald show projection devices in which devices for positioning a transparency and a shutter device are integrated or built into the projector. Thus, these patents do not disclose a portable presentation device as that of the invention.

Although the art may have produced devices said to be suitable for permanent installations, a need remains for a simple, portable, and easy to use device that allows a person to make effective presentations using a variety of projectors.

SUMMARY OF THE INVENTION

It is an object of the invention to provide a device for assisting the presentation of transparencies on an overhead projector by blocking the projection of a transparency when so desired.

Another object of the invention is to provide such a transparency presentation device which is compact and light in weight and therefore readily portable.

A further object of the invention is to provide a transparency device which is inexpensive as well as simple to produce.

An additional object of the invention is to provide a transparency presentation device which can be readily positioned on the light table of an overhead projector and can conveniently be retained thereon.

These and other objects are accomplished in the invention. The invention includes a support frame, an aperture cover and reusable adhesive means. The support frame is generally flat and preferably rectangular in form with its lateral dimensions being slightly greater than those of the transparencies to be used. The other periphery of the support frame provides a support surface on which transparencies can be placed and supported during presentation. The inner edges of the support surface define an aperture which is smaller than the area defined by the outside dimensions of the transparencies to be used, and equal in area of the portion of the transparency to be projected. This aperture is preferably rectangular and centered on the support frame. Also carried on the support frame are means for aligning a transparency relative to the frame which can comprise upwardly-projecting register pins capable of engaging similarly placed holes in a transparency in order that a transparency can be quickly and easily placed in proper position for accurate projection.

The device also includes an aperture cover mounted on the support frame. The cover is adapted to be moved between two positions. In the open position, the aperture cover is slidably moved on the frame to uncover the aperture. In the open position, light can pass through the aperture and project an image of the transparency on a convenient viewing surface such as a wall or a screen. In a closed position, the aperture cover completely covers the aperture, thereby preventing the passage of light through the transparency. During the time when the aperture cover is in the closed position, the user can change transparencies or prevent the audience's attention from being distracted from the spoken words of the user.

The device of the invention also includes reusable adhesive means for temporarily affixing the frame to the overhead projector. The fact that these means are reusable allows the user to make repeated presentations without concern for complicated mounting devices or for replenishing the adhesive to be used. The fact that these means include adhesive provides the advantage of very quick installation, coupled with the ability to retain the device in a fixed position during the entire presentation.

Primary advantages of the present invention are its ease of use and ease of manufacture. The lightweight, low-profile construction makes it possible for a person to carry the device in a briefcase or similar convenient receptacle without adding significantly to either the weight or the bulk being carried.

Similarly, the invention greatly facilitates manufacture. Both the frame and the aperture cover each can be manufactured from single pieces of lightweight material such as cardboard, light plastic or the like. In the instance of the frame, the only manufacturing operation required is to cut the aperture and insert the alignment pins. Forming the aperture cover requires a folding operation, easily accomplished on high-speed equipment. Clearly, the present invention offers the solution to the long-felt need for a device which can facilitate overhead projector presentations.

BRIEF DESCRIPTION OF THE DRAWINGS

FIG. 2 is an exploded perspective view of the invention showing the elements thereof;

FIG. 3 is a plan view of of the presentation device of the invention;

FIG. 4 shows a transparency in position on the presentation device with the mask in a closed position;

FIG. 5 shows the mask in an open position with a transparency position in alignment with the aperture;

FIG. 6 is a vertical section taken along the line 6—6 in FIG. 4 showing the mask closed;

FIG. 7 is a vertical section taken along line 7—7 in FIG. 5 and showing the mask open, and showing the adhesive means for securing the presentation device; and FIG. 8 is a fragmentary plan view showing adhesive means for securing the presentation device.

DETAILED DESCRIPTION OF THE PREFERRED EMBODIMENT

Figure 1:
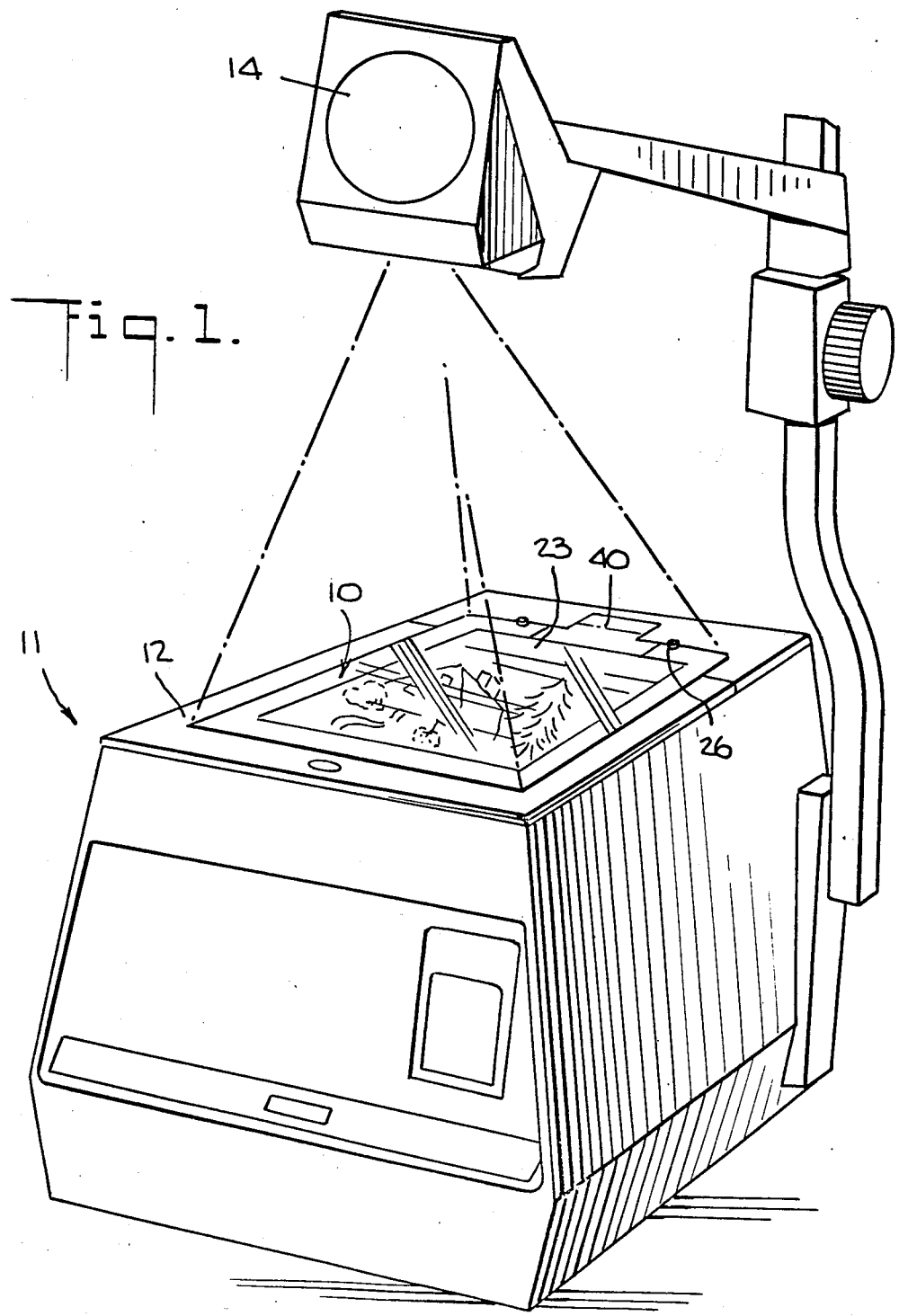
FIG. 1 is a perspective view of a preferred embodiment of the invention showing the presentation device positioned on an overhead projector.

A preferred embodiment 10 of the transparency presentation device of the invention is shown in FIG. 1. As can be seen, the device 10 is used in conjunction with an overhead projector 11. The overhead projector shown is of conventional design, but of course, any of the wide variety of overhead projectors available on the market can be used in conjunction with the invention.

The device 10 is used by placing it on the light table 12 of the projector, i.e., the generally transparent window area through which light is directed, in order to project a transparency 13 through the projector lens 14.

As shown in FIG. 2, the device 10 generally comprises two assemblies, viz. a support frame 20 and an aperture cover 30. The support frame is flat and generally rectangular in form with its outer periphery forms a support surface 22. The outer edges 22a of the support surface are dimensioned slightly larger than the transparency 23 in order to provide sufficient support around the edges of the transparency to support it during projection. The inner edges 22b of the support surface 22 define an aperture 24. The dimensions of the aperture 24 are chosen with respect to the transparency 23 so that the dimensions of the aperture define the area of the transparency 23 to be projected.

Transparency 23 is accurately positioned with respect to aperture 24 by locating pins 26 carried in a convenient position in a portion of the support surface located on a shorter leg of the rectangular form. For greatest ease of use, the pins should be equidistant from the central line of the aperture and should be dimensioned to fit within the holes 23a in the margin of the transparency which can be created by a standard office two-hole punch. It thus is convenient for the user to position a transparency on the frame by engaging holes 23a onto the alignment pins 26 enabling the transparency to be positioned with respect to aperture 24.

Aperture cover 30 is a low-profile box-like structure having a top 32, a bottom 34, and side walls 36. These elements define a front opening or slot 38 which is adapted to receive the support frame as shown in FIG. 3. To assist the user in moving the aperture cover back and forth, a gripping device such as finger hole 39 can be provided in the end portion of the aperture cover opposite the front opening 38. The aperture cover 30 can be dimensioned to insure that the distance from the front opening 38 to the finger hole 39 is greater than the distance from the alignment pins 26 to the end of the support frame. In this way, the aperture cover can completely cover a transparency, yet the user cannot accidentally grasp the transparency when moving the aperture cover.

Adjacent slot 38 within the interior of the cover 30 and offset from the edges of top 32 and bottom 34 (FIGS. 2 and 3) there is disposed elongated element or catch 37 which is secured to the inner surfaces of top 32 and bottom 34 and extends adjacent and between inner edges 22b of the support surface 22. When cover 30 is moved away from locating pins 26 to a fully open position, catch 37 abuts inner edge 22c, thereby preventing the cover from being disengaged from the support frame 20. The catch 37 is offset from the edge 32a of top 32 and the edge 32a of bottom 34 at slot 38 to enable these edges to advance over edge 22d of the support surface, thereby enabling the cover to block all portions of aperture 24 when the cover is closed (FIG. 6). In the closed position, the edge 32a of top 32 at slot 38 is adjacent locating pins 26. Since catch 37 is offset, cover 30 can prevent any leakage of light from the light table when the cover is in the closed position.

Both the support frame and the aperture cover can be fabricated from any lightweight, convenient material. It is preferred that both of these components be a stiff yet light cardboard. The support frame 20 can be manufactured by a simple cutting operation, the cutter removing the aperture 24 and forming holes for the alignment pins. The aperture cover 30 can be of the same material. Scoring and folding operations can be employed following the cutting of a blank as will be familiar to those in the art. Side walls 36 can thus be formed by folding the blank around a relatively narrow radius, to provide a close fit of the aperture cover 30 over the support frame 20.

An important feature of the invention is the ability to secure the presentation device 10 on the light table 12 of the projector quickly and easily, while insuring that transparencies are always displayed in proper alignment. Prior art devices generally require cumbersome apparatus to accomplish this goal, but the invention provides reusable adhesive means 40 to enable the user to affix the device readily to the projector. FIG. 8 shows the reusable adhesive means 40 in a detailed view. An attachment opening 42 extends through the front end of the support frame 20. The opening 42, preferably somewhat elongated, is formed in the support surface 22 between the alignment pins 26. An adhesive means, preferably a portion of tape 44 such as cloth tape, is affixed to the top surface of the support frame, such that the adhesive coating on the tape is accessible through the opening 42. An adhesive protector 46, preferably a rectangular piece of clear resin material, is also engaged by the adhesive portion of the tape, such that the protector 46 extends forward from the support frame, as shown. When the device is not in use, the adhesive protector 46 can be folded around the support surface and pressed against the window such that the protector 46 engages the adhesive surface. Inasmuch as the adhesive surface is not exposed to the atmosphere, it retains its adhesive properties. The user can readily remove the protector 46 from the window 42, position the support frame on the projector body, and then temporarily affix the support frame 20 to the projector body by pressing on the top surface of the window. At the conclusion of the presentation, the device 10 can be removed from the projector and the protector 46 returned into engagement with the adhesive. After an extended period of repeated usage, the cloth tape may begin to lose its adhesive property. At such time, the cloth tape can be removed and discarded, to be replaced with another piece of cloth tape, reusing the protector 46.

OPERATION

Operation of the invention is shown in FIGS. 5-8. Preliminarily, the device 10 is temporarily affixed to the projector body. The aperture cover 30 is moved to the first, closed, position in order that no light passes through to the projector lens 14. A transparency 23 is then placed over the alignment pins 26, in position for viewing. It should be noted that unlike prior art devices, the transparency 23 is carried on the device 10 in a convenient position atop both the support frame and the aperture cover, as best seen in FIGS. 4 and 6.

When the user wishes to project the image of the transparency 23, finger opening 39 is grasped and the aperture cover 30 moved in the direction of arrow A in FIG. 5 allowing light to pass through the transparency and on to the projector lens 14. It should be noted, as shown in FIG. 5, that the top surface 32 of the aperture cover 30 remains under the transparency 23 during projection, thereby allowing for easy return of the aperture cover 30 to a closed position without striking the bottom edge of the transparency 23. Between transparencies, or when the user wishes to achieve the undivided attention of the audience, aperture cover 30 is returned to a closed position, preventing further projection of the transparency. Changing transparencies is, as explained above, extremely easy, as the device retains its aligned position atop the projector body, and alignment pins 26 facilitate quick and accurate positioning of individual transparencies by engaging alignment holes 28.

Because the transparency presentation device allows for accurately positioned placement of transparencies, use of multiple transparencies as overlays can be facilitated by the consistent registration alignment afforded by the alignment pins 26. This will allow for greatly expanded use of transparencies in situations (both educational [teachers, etc.] and presentational [sales persons, engineers, etc.]) where the cumulative addition of information using a number of transparency overlays in systematic progression is required.

It will be understood that many modifications to the present embodiment can be practiced within the scope of this invention. For example, both the support frame 20 and the aperture cover 30 could be fabricated from a well-known, very light and strong substance, such as plastic resin. Alternatively, improvements are possible in the pressure-sensitive reusable adhesive means that could allow for extended amounts of usage before changing the adhesive tape. These and other improvements and modifications may be made within the spirit of the present invention, which is defined solely by the claims appended hereto.

What is claimed is:

1. Device for assisting the presentation of a transparency by an overhead projector comprising:

a support frame planar in form and adapted to be attached at one planar side thereof to an overhead projector adjacent the projection system thereof, the support frame having support surfaces disposed at the opposite planar side and adjacent the outer periphery thereof, outer edges of the support surfaces being dimensioned in a lateral direction larger than a transparency, inner edges of the support surface defining an aperture which is smaller in a lateral direction than a transparency;

means for positioning a transparency on the support frame to overlay the aperture;

an aperture cover slidably mounted on the support frame between an open position uncovering the aperture and a closed position covering the aperture, the aperture cover having one surface portion thereof facing and extending across the aperture and the support surface in the closed position and an opposite surface portion for supporting a transparency with respect to the aperture in the closed position of the aperture cover; and means mounted on the support frame for releasably attaching the support frame to the projector with the aperture in alignment with the projection system of the overhead projector.

2. A device in accordance with claim 1 in which the aperture cover comprises a sleeve having a top portion, a bottom portion underlying the top portion, and side wall portions connecting the top portion to the bottom portion with a space therebetween, the top portion and the bottom portion defining a slot adapted to receive the support frame therein for slidable longitudinal movement of the aperture cover with respect to the support frame.

3. A device in accordance with claim 2 and further comprising means disposed with one end portion of the slot of the sleeve of the aperture cover for abutting the support frame when the aperture cover is opened to prevent disengagement of the aperture cover from the support frame.

4. A device in accordance with claim 3 in which the abutting means is offset inwardly from the edge of the end portion of the aperture cover to enable the aperture cover to extend beyond the aperture when the aperture cover is closed to prevent the escape of light with respect to the aperture cover.

5. A device in accordance with claim 4 in which the abutting means comprises a web extending across the slot of the sleeve of the aperture cover between the inner edges of the aperture.

6. A device in accordance with claim 1 and further comprising a window formed in the support frame adjacent the transparency positioning means, and in which the means for releasably attaching the support frame to the projection body comprises pressure sensitive adhesive means overlying the window, whereby a surface of the body of the projector when bearing against the bottom surface of the support frame can be adhesively engaged by the pressure sensitive adhesive means.

7. A device in accordance with claim 6 and further comprising protective cover means secured to the pressure sensitive adhesive means and movable between a protecting position in engagement with portion of the pressure sensitive means accessible through the window, and a retracted position remote from the window.

* * * * *